(12) United States Patent
Fujimori (10) Patent No.: US 6,742,900 B2
(45) Date of Patent: Jun. 1, 2004

(54) PROJECTOR

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/412,065

(22) Filed: Apr. 11, 2003

(65) Prior Publication Data

US 2003/0223047 A1 Dec. 4, 2003

Related U.S. Application Data

(63) Continuation of application No. 09/912,070, filed on Jul. 24, 2001, now abandoned.

(30) Foreign Application Priority Data

Jul. 24, 2000 (JP) ........................................ 2000-221705

(51) Int. Cl.[7] ........................ G03B 21/14; G03B 21/22; G03B 21/16
(52) U.S. Cl. ........................................ 353/119; 353/61
(58) Field of Search ............................. 353/30, 31, 32, 353/33, 56, 61, 119

(56) References Cited

U.S. PATENT DOCUMENTS

| | | | | |
|---|---|---|---|---|
| 5,313,234 A | * | 5/1994 | Edmonson et al. | 353/61 |
| 5,651,599 A | * | 7/1997 | Fujimori et al. | 353/61 |
| 5,676,442 A | | 10/1997 | Fujimori | 353/119 |
| 5,806,952 A | * | 9/1998 | Fujimori | 353/119 |
| 5,951,136 A | * | 9/1999 | Furuhata et al. | 353/31 |
| 6,132,049 A | * | 10/2000 | Yamaguchi et al. | 353/61 |
| 6,345,896 B1 | * | 2/2002 | Kurosawa | 353/119 |
| 6,364,492 B1 | | 4/2002 | Fujimori et al. | 353/119 |
| 6,394,608 B1 | * | 5/2002 | Shiraishi et al. | 353/57 |
| 6,582,083 B2 | * | 6/2003 | Shiraishi et al. | 353/57 |

* cited by examiner

Primary Examiner—David Gray
Assistant Examiner—Andrew Sever
(74) Attorney, Agent, or Firm—Ladas & Parry (57) ABSTRACT

To provide a projector reduced in size and weight and countermeasures against EMI (Electro-Magnetic Interference) as well. The projector has vertically separable outer cases which accommodate an optical system comprising: a color beam splitting optical system for splitting light from a light source into beams of predetermined colors; an electro-optical device for modulating the color beams split by the color beam splitting optical system in accordance with image information; a color beam combining optical system for combining the color beams modulated by the electro-optical devices; and a projection lens for projecting the resultant beam combined by the color beam combining optical system. These optical components constituting the optical system are attached to a inner case, and the inner case is fixed to a lower case so as to accommodate at least the color beam splitting optical system in a enclosure constituted by the inner case and the lower case.

17 Claims, 12 Drawing Sheets

PROJECTOR

This is a continuation of application Ser. No. 09/912,070, filed Jul. 24, 2001, now abandoned.

BACKGROUND OF THE INVENTION

1. Field of the Invention

The present invention relates to a projector and more particularly to the structure thereof.

2. Description of the Prior Art

Conventionally known is a projector which comprises electro-optical devices for forming an optical image of a light beam emitted from a light source in accordance with image information and a projection lens for expanding and projecting the image formed by the electro-optical devices. The projector of this type has been widely used for multimedia presentation in a conference, an academic meeting, or an exhibition.

More particularly, such a projector has a color beam splitting optical system interposed between the light source and the electro-optical devices. The color beam splitting optical system is accommodated in an optical component housing (inner case) designed to block ambient light, being adapted to split a light beam from the light source into beams of three colors (red, green, and blue) and then transmit the respective color beams to the electro-optical devices. Then, three color images of the respective color beams formed in the electro-optical devices are transmitted to a color beam combining optical system (prism) to be combined into a color image, thereafter being expanded and projected via the projection lens supported by a metallic support member (a head body).

The projector of this type may be kept installed in a conference room for making a presentation. However, it is often carried therein as required, or carried therefrom after a presentation to be stored somewhere else. Accordingly, it is necessary to improve the portability of the projector for ease of carrying it and thus it has been desired to reduce the size and weight of the projector.

However, a conventional projector is provided with a inner case in each of the upper and lower cases to accommodate and fix various types of optical components, in order to prevent shift of the optical axis of the optical components caused by considerable heat generated by the light source portion, the color beam combining optical system, the power supply unit and so on. However, this configuration is a stumbling block in the way of reducing the size and weight of the projector.

There is also another problem with the conventional projector. That is, it is difficult to take measures against EMI (Electro-Magnetic Interference) since circuits for processing feeble video signals at high speed and a light-source lamp causing strong noise are accommodated together in a narrow space.

SUMMARY OF THE INVENTION

The present invention was developed in view of these problems. Accordingly, it is an object of the present invention to provide a projection display system which is further reduced in weight and size and which gives sufficient consideration to the countermeasures against EMI.

The present invention provides a projector having vertically separable outer cases which accommodate an optical system comprising a color beam splitting optical system for splitting light from a light source into beams of predetermined colors; an electro-optical device for modulating the color beams split by the color beam splitting optical system in accordance with image information; a color beam combining optical system for combining the color beams modulated by the electro-optical device; and a projection lens for projecting a resultant beam combined by the color beam combining optical system. The system is characterized in that optical components constituting the optical system are attached to a inner case. In addition, the inner case is fixed to one of the outer cases so as to accommodate at least the color beam splitting optical system in a enclosure constituted by the inner case and the one of the outer cases.

This allows the optical system to be constituted using one inner case, thereby making it possible to reduce the size and weight of the projector. In addition, air flows into and out of the optical system through an outer case, thereby providing the projector with improved thermal radiation. Furthermore, the inner case and the outer cases are fixed to each other to thereby reinforce each other complementarily, thus making it possible to prevent the positional shift of the optical axis of the optical system caused by aging or the deformation of the components constituting the optical system. From this point of view, it is preferable that the inner case is an integrated box-shaped body with an opening provided on a side.

Furthermore, the projection lens attached to the inner case facilitates the alignment of the optical axis of the optical system with that of the projection lens with ease and high accuracy.

Furthermore, a thermal insulation material interposed between the inner case and the outer case for accommodating the color beam splitting optical system makes it possible to prevent heat conduction from the optical system to the outer case.

Furthermore, the projector is characterized in that a prism is attached to the inner case, the prism constituting the color beam combining optical system. This can obviate the need of the special prism attachment member that has been conventionally used.

The projector is also characterized in that a recessed portion is formed adjacent to the projection lens on a top outside of the inner case, and the electro-optical device and the prism constituting the color beam combining optical system are arranged in the recessed portion. This makes it possible to form a flow path of air for cooling the electro-optical device, thereby providing an increased cooling effect. Besides, it is preferable that an air vent is provided near where the prism is attached to the inner case, thereby allowing the electro-optical device to be positively cooled.

Furthermore, the projector is characterized in that a mirror and a lens, constituting the optical systems, are fixed by resilient members. This makes it possible to fix these optical components without being damaged and prevent these components from dropping off when fixing the inner case to the outer cases.

The projector is also characterized in that a cable for electrically connecting the electro-optical device to a driver board for controlling the electro-optical device is led out from one side of the electro-optical device on the nearer side to the driver board. This allows the cables to be wired in a simple manner.

The projector is also characterized in that a driver board for controlling the electro-optical device is disposed on the top outside of the inner case. This allows the inner case to block noise generated by the light source and radiant heat from the optical systems. However, if countermeasures have been taken somehow against the noise or radiant heat, it is possible to arrange the driver board on the outer case, being integrated with the inner case, for accommodating the color beam splitting optical system.

Besides, it is possible to increase the packing density of components by forming a notched portion in the driver board and by accommodating a fan for cooling the electro-optical device in the notched portion.

It is also preferable to provide the outer cases, being integrated with the inner case, for accommodating the color beam splitting optical system with functions of positioning and supporting the optical components that constitute the optical system. Consequently, this makes it possible to positively position and stably hold each of the optical components. It is also possible to fix the optical components firmly with ease by fixing the inner case and the outer case for accommodating the color beam splitting optical system to each other with screws.

The projector is also characterized in that part of a housing for holding the light source is placed on an outer surface of the outer case, and the housing is made attachable to or detachable from the outer case by using the part of the housing. This makes it possible to replace the light source in conjunction with the housing, thereby facilitating the replacement of the light source. Besides, it is possible to prevent a spark between the housing and the light source by forming the housing of a resin.

It is also possible to provide further increased insulation against the light source by applying an insulation coating to a portion opposite to the light source in the inner case. This is particularly effective in the case where a high-intensity light source is employed.

Besides, it is preferable that the inner case and the outer cases of the present invention are formed of a resin or metal. For resin, there is an advantage of being light in weight and facilitating shaping and finishing. On the other hand, the high material strength of metal makes it possible to provide stabilized accuracy in size and a reduction in thickness to thereby provide a reduction in weight.

DETAILED DESCRIPTION OF PREFERRED EMBODIMENTS

Now, the present invention will be explained below with reference to the accompanying drawings in accordance with an embodiment.

(1) External Structure of the Projector

Figure 1:
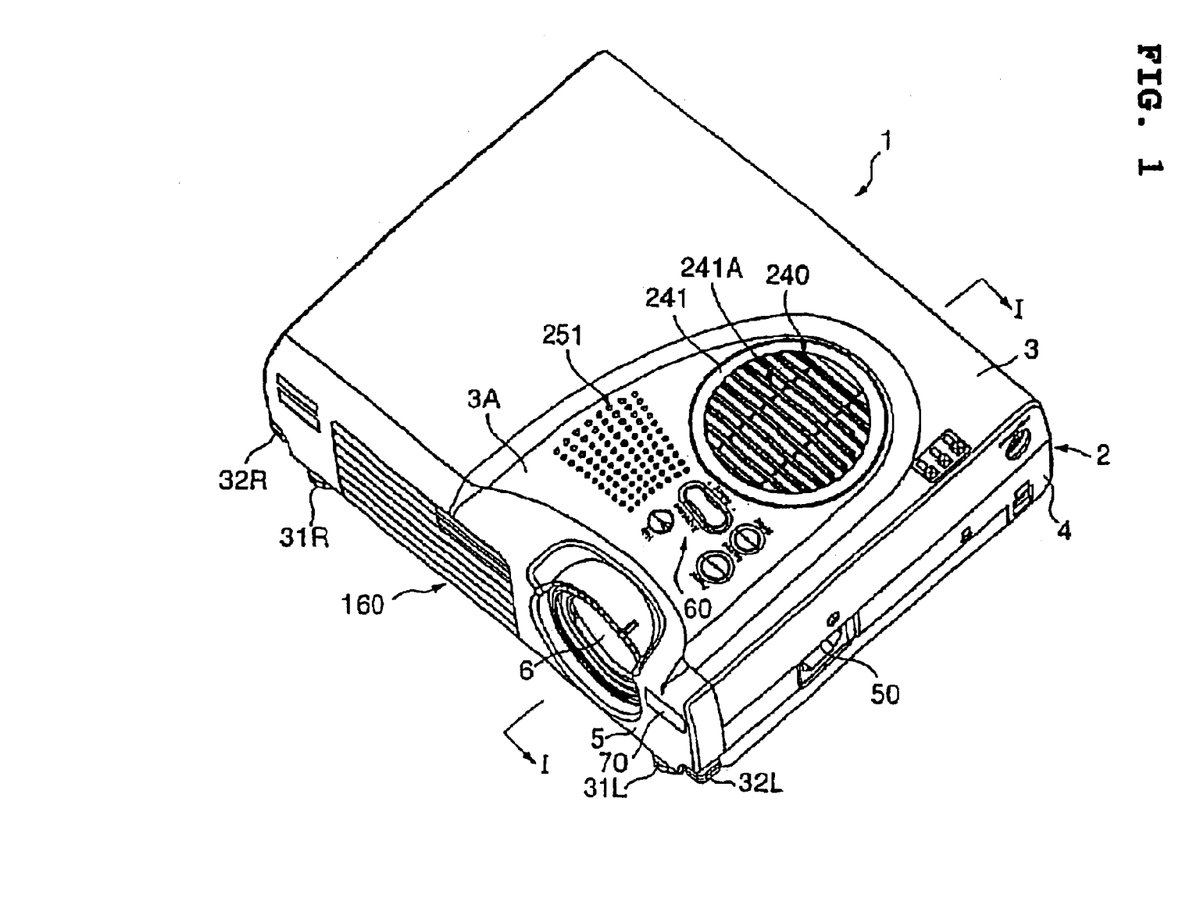
FIG. 1 is an external perspective view illustrating a projector, viewed from above, according to an embodiment of the present invention.
Figure 2:
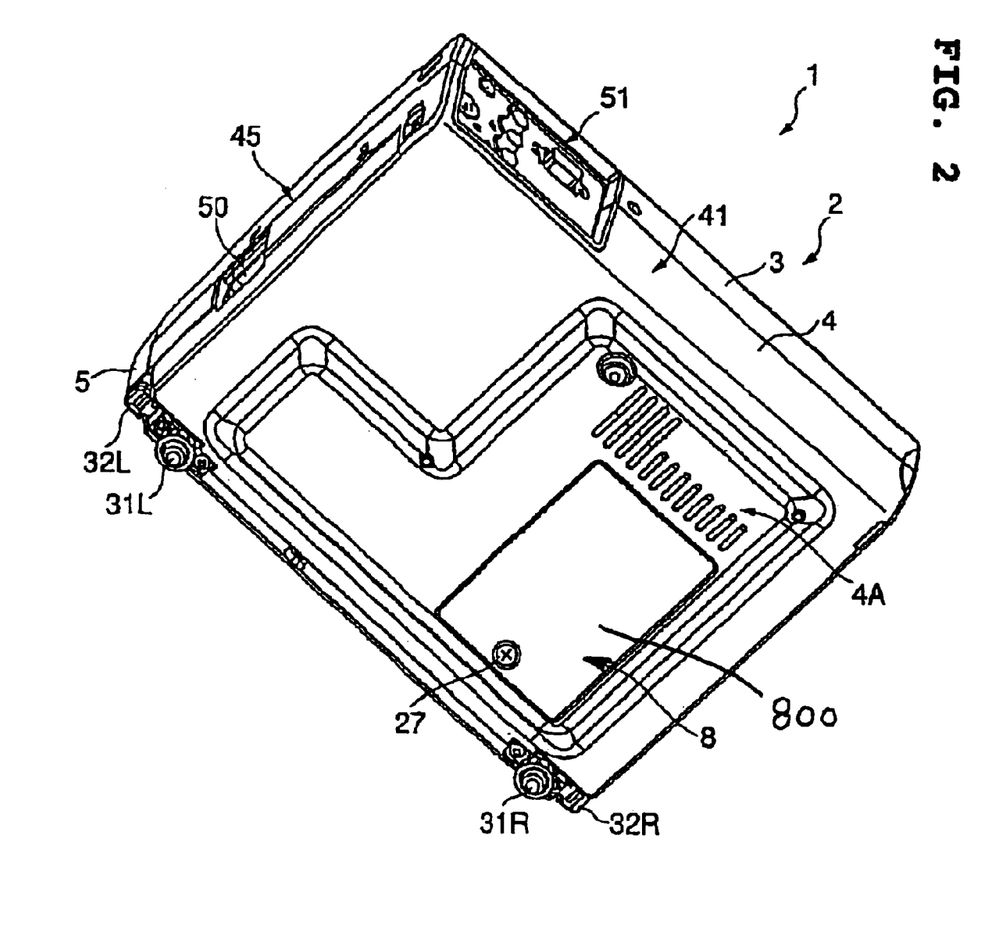
FIG. 2 is an external perspective view illustrating the projector of FIG. 1 viewed from below.

FIGS. 1 and 2 show schematic perspective views illustrating a projector 1 according to an embodiment, FIG. 1 being a perspective view of the projector viewed from above and FIG. 2 being a perspective view of the system viewed from below.

Main components of the projector 1 are accommodated in outer cases 2 forming a housing of the projector.

The outer cases 2 comprise basically an upper case 3 for covering the upper surface of the projector, a lower case 4 for constituting the bottom surface of the projector, and a front case 5 for covering the front portion of the projector. Here, the upper and lower cases 3, 4 are made by magnesium die casting and the front case 5 is formed of a resin.

Incidentally, these outer cases 2 may be all formed of a metal or resin. The metal is preferably magnesium, aluminum, or their alloys in terms of weight and heat radiation.

On the upper right portion of the upper case 3 (on the right thereof when viewed from the front), there is provided an air intake 240 covered with a filter replacement lid 241 made of a resin. The filter replacement lid 241 is provided with a slit-shaped opening 241A for introducing the air taken in from outside into the projector for cooling it. Inside the filter replacement lid 241, there is provided an air filter 242 (see FIG. 7). By detaching the filter replacement lid 241 from the upper side of the upper case 3, the internal air filter 242 can be replaced.

Figure 7:
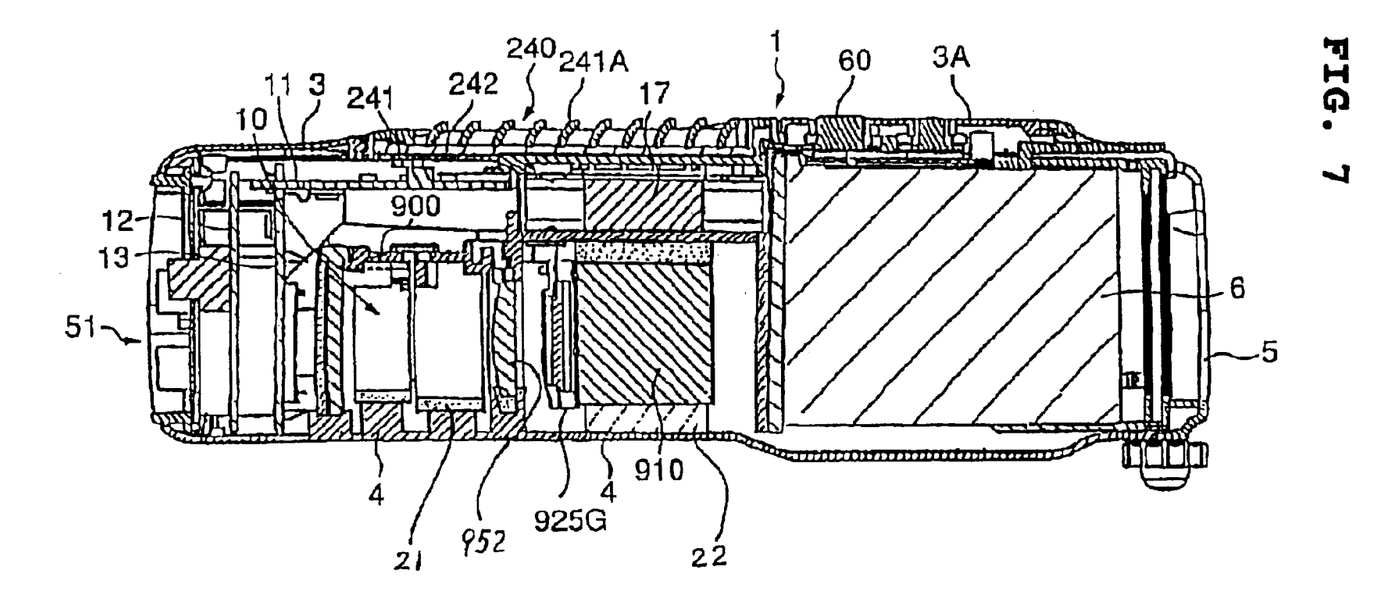
FIG. 7 is a cross-sectional view taken along line I—I of FIG. 1.

In addition, on the upper side of the upper case 3 and in front of the filter replacement lid 241, a plurality of communicating holes 251 are provided for use with a loudspeaker (not shown). Adjacent to the communicating holes 251, there is arranged a control panel 60 for adjusting the quality of an image provided by the projector 1. As shown in FIG. 7, the portion where the filter replacement lid 241, the communicating holes 251, and the control panel 60 are provided is a bulging portion 3A which is part of the upper case 3 expanded outwardly. Inside the space defined by the bulging portion 3A, components, such as the aforementioned air filter 242, the loudspeaker, and a printed circuit board 61 used for the control panel 60, are accomodated.

Referring to FIG. 2, exposed at the bottom of the lower case 4 is a base of a housing 800 of a light source lamp unit 8 which is accommodated inside the outer cases 2. By unscrewing a screw 27 for fixing the lower case 4 to the housing 800 and then by pulling out the base of the housing, the light source lamp unit 8 is drawn out from the lower case 4. In addition, there are provided feet 31R, 31L on the corners of the bottom front side of the lower case 4, while a foot 31C is provided at the center of the rear side. Incidentally, the feet 31R, 31L are designed to be advanced or retracted in the direction of protrusion b rotating their dials or by the operation of levers 32R, 32L, and the amount of advancement or retraction can be adjusted to change the height and angle of a displayed image.

Facing the front side of the front case 5, provided on the right portion thereof is a light-receiving portion 70 for receiving an optical signal from a remote controller (not shown). On a generally central portion of the front case 5, there is provided an air outlet 160 for exhausting the air from inside of the projector.

On a side 45 and a back 41, close to the air intake 240 of the outer cases 2, arranged are an AC inlet 50 for connecting with an external power supply and a group of various I/O terminals 51 that are exposed to outside.

(2) Internal Structure of the Projector

Figure 3:
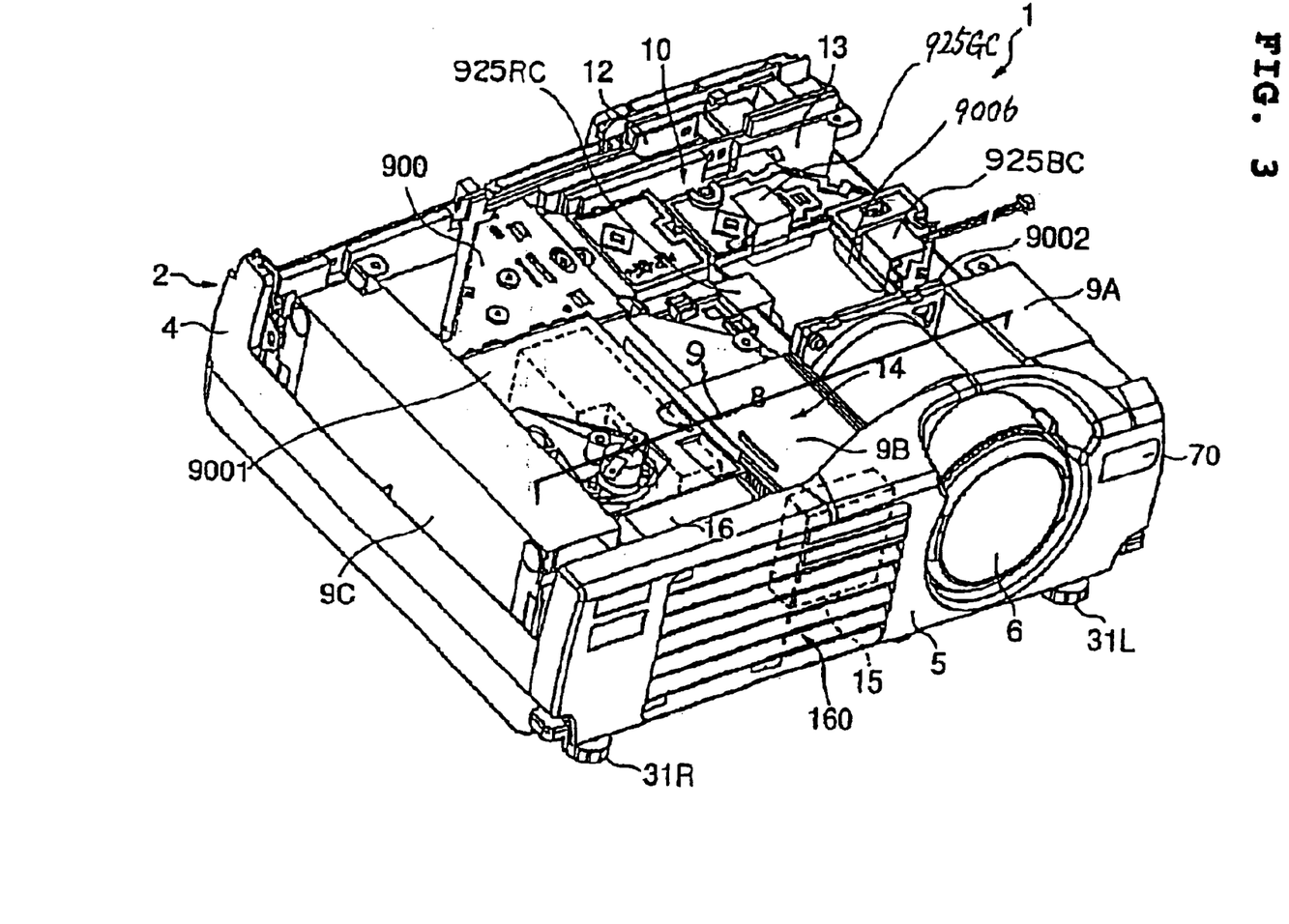
FIG. 3 is a perspective view illustrating the upper inner structure of the projector of FIG. 1.
Figure 4:
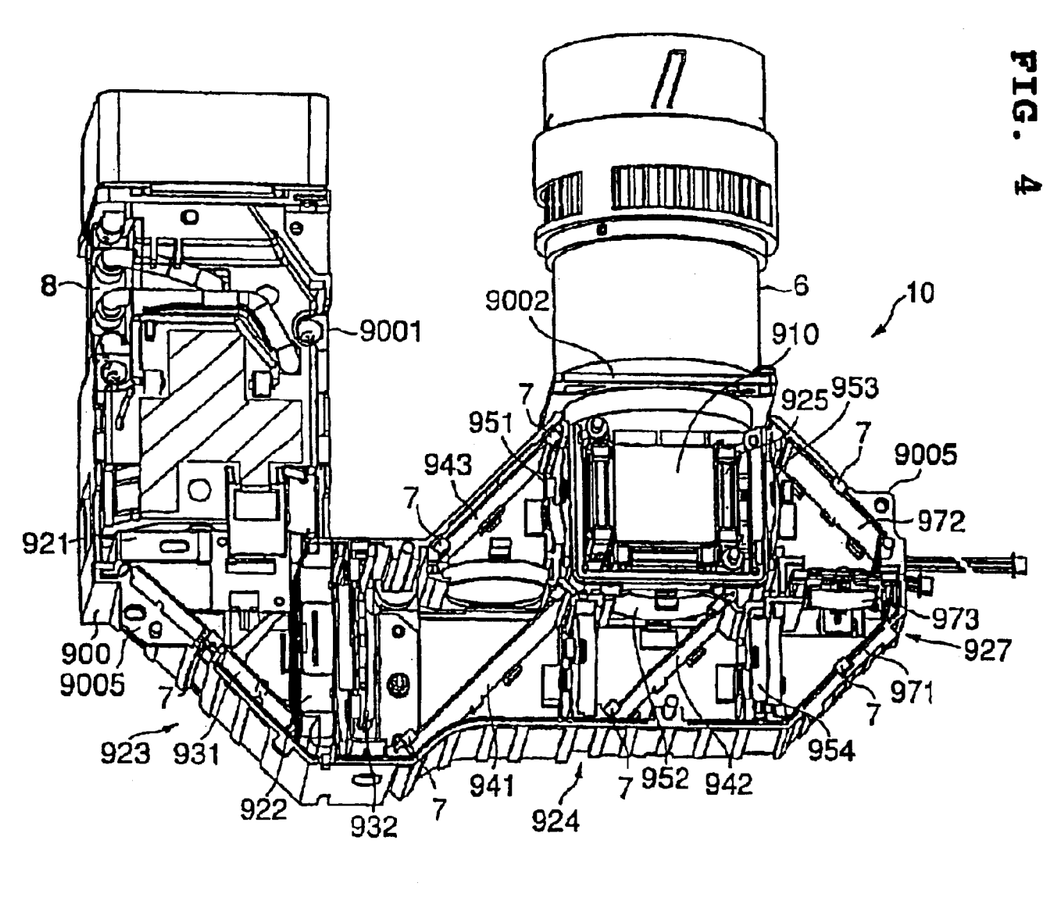
FIG. 4 is a schematic perspective view illustrating the configuration and structure of an optical system of the projector of FIG. 1.
Figure 5:
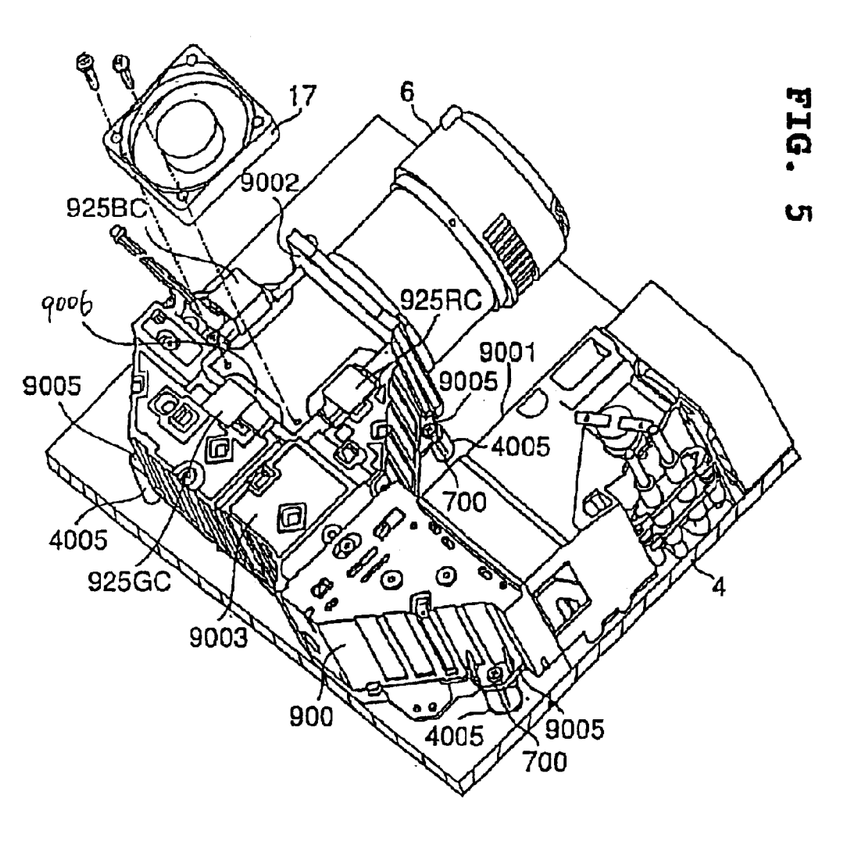
FIG. 5 is a perspective view illustrating the optical system of FIG. 4 being inverted to be fixed to a lower case.
Figure 6:
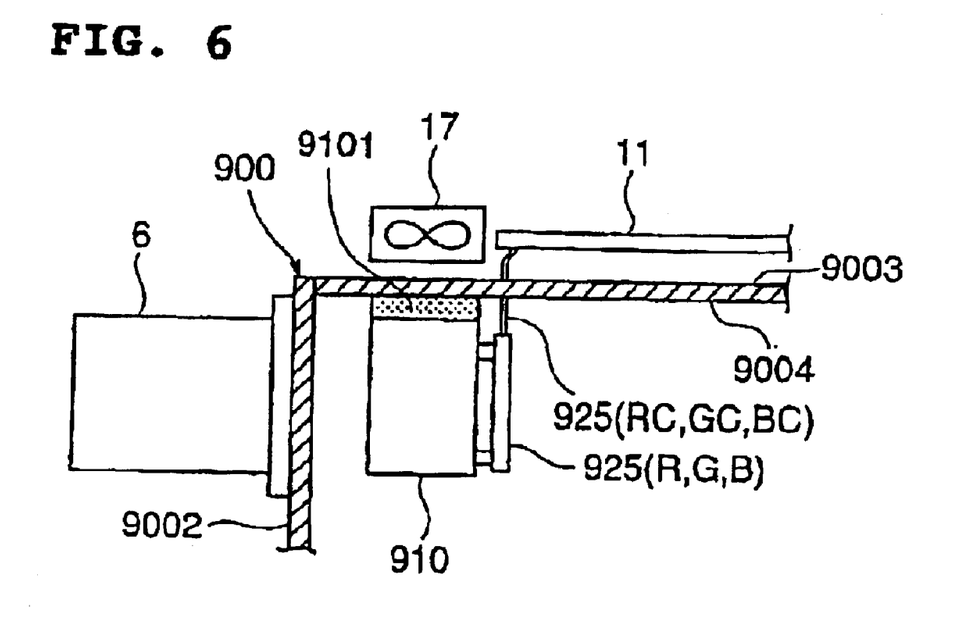
FIG. 6 is a conceptual view illustrating the configuration of an electro-optical devices a cross dichroic prism, an air intake fan, and a driver board in the optical system of FIG. 4.

FIGS. 3 to 7 illustrate the internal structure of the projector 1. FIG. 3 is a schematic perspective view illustrating the upper structure of the projector 1. FIG. 4 is a schematic perspective view illustrating the configuration and structure of the optical system of the projector 1. FIG. 5 is a schematic perspective view illustrating the optical system of FIG. 4 which is inverted and fixed to the lower case. FIG. 6 is a conceptual view illustrating the arrangement of an electro-optical device, a cross dichroic prism, an air intake fan, and a driver board in the optical system of FIG. 4. FIG. 7 is a cross-sectional view taken along line I—I of FIG. 1.

Referring to these figures, inside the outer cases 2, arranged are components such as the light source lamp unit 8, a power source unit 9 as a power supply, an optical unit 10, the driver board 11 for controllably driving the electro-optical devices to be described later, a main board 12 as a main control circuit board, and an AV board 13 as a video & audio circuit board. Thus, in this embodiment, the light source lamp unit 8, the optical unit 10, and the aforementioned projection lens 6 constitute a U-shaped optical system, while the boards 11, 12, 13 constitute a control system.

The power source unit 9 comprises a first power supply block 9A arranged on a side of the projection lens 6 of the optical system, a second power supply block 9B disposed inside an opening portion 14 at the center of the planate U-shaped optical system, that is, between the projection lens 6 and the light source lamp unit 8, and a third power supply block 9C arranged on a side of the light source lamp unit 8 of the optical system.

The first power supply block 9A comprises an AC inlet 50 and distributes power supplied from an external power supply through the AC inlet 50 to the second power supply block 9B and the third power supply block 9C.

The second power supply block 9B transforms the power provided by the first power supply block 9A to supply the resultant power mainly to the main board 12 that constitutes the aforementioned control system. The second power supply block 9B is provided with an auxiliary air exhaust fan 15 driven by power from the second power supply block 9B on the side of the air outlet 160.

The third power supply block 9C transforms the power provided by the first power supply block 9A to supply the resultant power to a light source device 183 (see FIG. 8) in the light source lamp unit 8. The third power supply block 9C has to supply power to the light source device 183 that requires the maximum amount of power consumption, and is therefore designed to be larger than the first and second power supply blocks 9A, 9B, being so large as to be arranged across the projector 1.

The first to third power supply blocks 9A–9C described above are fixed with screws to the lower case 4 prior to installation of the optical unit 10 containing the projection lens 6. Incidentally, the first power supply block 9A may be adapted to supply power only to the second power supply block 9B which in turn distributes power to the third power supply block 9C.

Figure 8:
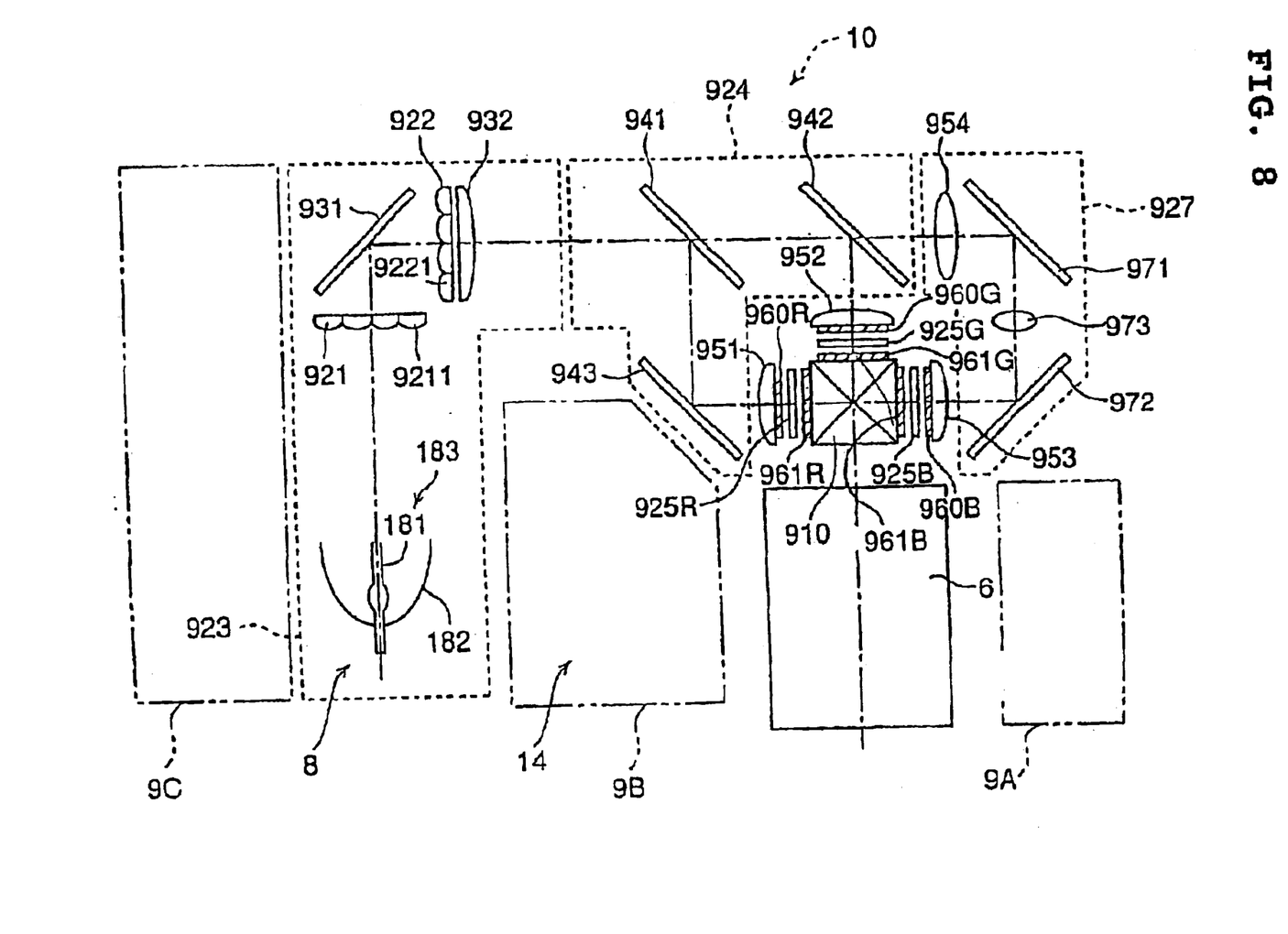
FIG. 8 is an explanatory schematic view illustrating the function of the aforementioned optical system.

The light source lamp unit 8 constitutes the light source portion of the projector 1 and is provided with the light source device 183 comprising a light source lamp 181 and a concave mirror 182, and the housing 800 for supporting the light source device 183, as shown in FIG. 8. The light source lamp unit 8 configured as such is covered with an accommodating portion 9001 and is adapted to be removed from the projector 1 by unscrewing the screw 27 on the bottom of case 4. The accommodating portion 9001 is formed into a unitary body with an inner case 900 to be described later. In addition, as shown in FIG. 3, in front of the accommodating portion 9001 and at the position corresponding to the air outlet 160, there is arranged a main exhaust fan 16 that is larger than the auxiliary air exhaust fan 15. The main exhaust fan 16 is also driven by the power supplied by the second power supply block 98.

The optical unit 10 optically processes light emitted from the light source lamp unit 8 to form an optical image corresponding to image information and is mounted on the inner case 900 formed as an integrated box-shaped body with an opening provided on one side thereof as shown in FIG. 4. The inner case 900 serves as a housing for mounting in place each optical component that constitutes the optical system and is formed of a resin or metal (Mg, Al, or an alloy of therm). The inner case 900 accommodates components such as an illuminating optical system 923, a color beam splitting optical system 924, a relay optical system 927, and a cross dichroic prism 910 to which the electro-optical device 925 or liquid crystal panels 925R, 925G, 925B are fixed. The inner case 900 further comprises a vertical head plate 9002 adjacent to the light transmission side of the cross dichroic prism 910 and the projection lens 6 is fixed thereon.

The inner case 900 to which the aforementioned optical components constituting the aforementioned optical path system are attached is fixedly screwed to the lower case 4, with the opening oriented downwardly, thereby allowing the optical system except the projection lens 6 to be accommodated in the enclosure comprising the inner case 900 and the lower case 4 (see FIG. 5). Incidentally, it is preferable to accommodate at least the color beam splitting optical system 924 and the relay optical system 927 in such a enclosure in order to block ambient light.

There is provided air vents 9006 around a mounting portion of the cross dichroic prism 910 on the inner case 900. The cooling air introduced by an air intake fan 17 (see FIGS. 5 and 7) flows from the air vents to the liquid crystal panels 925R, 925G, 925B to cool them. Incidentally, the power for driving the air intake fan 17 can be supplied from the main board 12 via the driver board 11.

The driver board 11 is arranged above the optical unit 10 (on the side of the upper case) to control each of the aforementioned liquid crystal panels 925R, 925G, 925B. Incidentally, the main board 12 has a control circuit for controlling the entire projector 1 and is installed in a standing manner at the back of the optical unit 10. Accordingly, the main board 12 and the driver board 11 are arranged substantially at right angles to each other and electrically connected to each other via a connector. Incidentally, an AV board 13 for controlling sound and video signals is interposed in a standing manner between the optical unit 10 and the main board 12.

In the internal configuration described above, the cooling air that has been taken in by the air intake fan 17 from the air intake 240 cools each of the liquid crystal panels 925R, 925G, 925B. Thereafter, the cooling air is guided toward the light source lamp unit 8 by the rotation of each of the air exhaust fans 15, 16, while cooling each of the boards, 11, 12, 13. Then, the cooling air flows mainly into the light source lamp unit 8, in conjunction with new cooling air from an intake hole 4A (see FIG. 2) provided on the bottom of the lower case 4, to cool the internal light source device 183. In addition, part of the cooling air flows by the second power supply block 9B, whereas other part flows by the third power supply block 9C to cool each of them. After that, the cooling air is exhausted from the front side of the projector 1 through the air outlet 160 by means of each of the air exhaust fans 15, 16.

(3) Structure of the Optical System

Now, the optical unit 10 of the optical system will be explained in detail with reference to FIGS. 4 to 8.

The optical unit 10 comprises the illuminating optical system 923, the color beam splitting optical system 924, the relay optical system 927, the cross dichroic prism 910 as a color beam combining optical system, and the electro-optical device 925 disposed around the cross dichroic prism 910, which is attached to the inner case 900. The lens unit 10 further comprises the projection lens 6 disposed on the head plate 9002 of the inner case 900.

The illuminating optical system 923 is an integrator illuminating optical system for providing substantially uniform illumination on the image forming area of the three liquid crystal panels 925R, 925G, 925B as the electro-optical device 925. The illuminating optical system 923 comprises the light source device 183, a first lens array 921, a second lens array 922, a reflective mirror 931, and a superimposing lens 932. These first and second lens arrays 921, 922, the superimposing lens 932, and the reflective mirror 931 are arranged being supported by an erected portion of the inner case 900 and fixed by resilient clips 7 as members for preventing those optical components from dropping off so that those optical components do not drop off even if the inner case 900 is inverted.

The light source device 183 constituting the illuminating optical system 923 has the light source lamp 181 serving as a source of illumination for emitting radial beams and the concave mirror 182 for transmitting the illumination from the light source lamp 181 as substantially parallel beams. As the light source lamp 181, a halogen lamp, a metal halide lamp, or a high-pressure mercury lamp is often employed. As the concave mirror 182, a parabolic mirror or an elliptical mirror is preferable to use.

The first lens array 921 is provided with small lenses 9211, each of which has a generally rectangular contour and which are arranged in a matrix with M rows and N columns. Each of the small lenses 9211 splits the parallel beams incident thereupon from the light source into a plurality of (i.e., M×N) sub-beams, which are in turn focused in the vicinity of the second lens array 922. The contour of each of the small lenses 9211 is designed to be similar in shape to the image forming area of the liquid crystal panels 925R, 925G, 925B. For example, if the aspect ratio (i.e., the ratio of a horizontal to vertical dimension) of the image forming area of a liquid crystal panel is 4:3, the aspect ratio of each of the small lenses is set to the ratio of 4:3.

The second lens array 922 is provided with the small lenses 9221 arranged in a matrix with M rows and N columns corresponding to the small lenses 9211 of the first lens array 921. The second lens array 922 has the function of allowing the center axis (principal ray) of each of the sub-beams transmitted from the first lens array 921 to impinge perpendicularly upon the incident plane of the superimposing lens 932. Here, the superimposing lens 932 has the function of superimposing a plurality of sub-beams on each other on the three liquid crystal panels 925R, 925G, 925B. Furthermore, the second lens array 922 is arranged at an angle of 90 degrees to the first lens array 921 across the reflective mirror 931.

The reflective mirror 931 is a mirror for guiding beams transmitted from the first lens array 921 to the second lens array 922 and therefore not always required depending on the configuration of the optical system. For example, the reflective mirror 931 is not necessary if the first lens array 921 and the light source are arranged parallel to the second lens array 922.

The color beam splitting optical system 924 comprises two dichroic mirrors 941, 942 and a reflective mirror 943 as optical components, and has the function of splitting the light transmitted from the superimposing lens 932 of the illuminating optical system 923 into beams of three colors of red, green, and blue. Just as in the foregoing, each of the mirrors 941, 942, 943 is supported by the erected portion of the inner case 900 and fixed to the inner case 900 by the resilient clips 7.

The relay optical system 927 comprises an incident side lens 954, a relay lens 973, and reflective mirrors 971, 972. These reflective mirrors 971, 972 are also fixed to the inner case 900 by the resilient clips 7.

For example, the liquid crystal panels 925R, 925G, 925B employ polysilicon TFT as a switching element, which are arranged opposite to three sides of the cross dichroic prism 910 and fixedly stuck via a fixing member on corresponding sides of the cross dichroic prism 910. Incidentally, with respect to mutual positioning relation of the liquid crystal panels 925R, 925G, 925B, the liquid crystal panel 925B is arranged opposite to the liquid crystal panel 925R across the cross dichroic prism 910, while the liquid crystal panel 925G is arranged opposite to the projection lens 6 across the cross dichroic prism 910. In addition, the liquid crystal panels 925R, 925G, 925B are provided with incident side polarizers 960R, 960G, 960B on each light incident side, while being provided with transmitting side polarizers 961R, 961G, 961B on each light transmitting side, respectively.

The cross dichroic prism 910 has the function of combining beams of three colors into a color image and is provided with a multi-layered dielectric film for reflecting a red beam and a multi-layered dielectric film for reflecting a blue beam, which are formed practically in the shape of a letter X at the boundaries of four rectangular prisms. These multi-layered dielectric films serve to combine the beams of three colors.

The projection lens 6 is the heaviest optical component in the projector 1, and is fixedly screwed to the head plate 9002 of the inner case 900 via a flange.

The optical unit 10 configured as described above is assembled as follows.

First, the box-shaped inner case 900 is placed to allow the opening thereof to be directed upwardly, that is, to allow the top of the inner case 900 to be directed downwardly. Then, the light source lamp unit 8 is inserted into the light-source-unit accommodating portion 9001 inside the inner case 900. Then, disposed therein is each of the optical components (such as reflective mirrors and various lenses) that constitute the illuminating optical system 923, the color beam splitting optical system 924, the relay optical system 927 and the like. Then, those optical components are fixed to the inner case 900 by means of the resilient clips 7 or the like. Furthermore, the cross dichroic prism 910, to which the liquid crystal panels 925R, 925G, 925B are fixed, is fixed to the top inside 9004 of the inner case 900 (see FIG. 6). Here, suppose the inner case 900 is formed of a resin such as an unsaturated polyester resin. In this case, it is possible to directly fix the cross dichroic prism 910 to the inner case 900 with an adhesive or the like. On the other hand, in the case of the inner case 900 formed of a metal such as magnesium, the cross dichroic prism 910 is first fixedly stuck to a prism fixture plate 9101 formed of a resin, and then the prism fixture plate 9101 and the inner case 900 can be fixed with a screw onto each other. Finally, the projection lens 6 is fixedly screwed onto the head plate 9002 of the inner case 900.

The inner case 900 to which the optical components have been attached as described above is inverted, and then the inner case 900 and the lower case 4 are fixed with screws 700 by making use of projected pieces 9005 provided on the inner case 900 and the screw holes of boss portions 4005 formed on the lower case 4 in a manner such that the optical components constituting the optical system are accommodated between the inner case 900 and the lower case 4 (see FIG. 5). Conduction of the heat generated in the optical system to the lower case 4 can be reduced, by inserting a heat insulating sheet 4.1 or the like between the inner case 900 and the lower case 4.

Incidentally, the inner case 900 and the lower case 4, or the inner case 900 and the projection lens 6 may be fixed to each other, by using an appropriate method such as adhesive or engagement, as well as the screws as in the foregoing.

In addition, the lower case 4 may be provided, at the positions corresponding to each of the optical components constituting the optical systems, with projections for supporting the optical components. This facilitates their assembly and assures stable retention of the optical components so that a shifting of the optical axis is hardly caused. At this time, it is also possible to insert a resilient cushion member 21 between the edge side of each mirror or lens (excluding the projection lens 6) and their support portion of the lower case 4, or insert a prism retainer 22 between the cross dichroic prism 910 and the lower case 4, so that these optical components are prevented from floating.

(4) The Function of the Optical Systems

In the optical unit 10 shown in FIG. 8, the substantially parallel light emitted from the light source device 183 are split into a plurality of sunbeams by means of the first and second lens arrays 921, 922, which constitute the integrator optical system (the illuminating optical system 923). The sub-beams transmitted from each of the small lenses 9211 of the first lens array 921 are generally superimposed on each other on the image forming area of the liquid crystal panels 925R, 925G, 925B by means of the superimposing lens 932. Consequently, each of the liquid crystal panels 925R, 925G, 925B is illuminated with a beam of light having a generally uniform distribution of light intensity in a plane.

At this time, the beam of red component of the beams transmitted from the illuminating optical system 923 is reflected on the first dichroic mirror 941 of the color beam splitting optical system 924, while the beams of blue and green components pass through the dichroic mirror 941. The red beam reflected on the first dichroic mirror 941 is reflected again on the reflective mirror 943 and then passes through a field lens 951 to reach the liquid crystal panel 925R for red color. The field lens 951 collimates each of the sub-beams transmitted from the second lens array 922 with respect to the center axis (the principal ray). Other field lenses 952, 953 disposed in front of the other liquid crystal panels 925G, 925B function similarly.

Of the blue and green beams that have passed through the first dichroic mirror 941, the green beam is reflected on the second dichroic mirror 942 and then reaches the liquid crystal panel 925G for green color through the field lens 952. On the other hand, the blue beam passes through the second dichroic mirror 942 and the relay optical system 927, and further travels through the field lens 953 to reach the liquid crystal panel 925B for blue color. Incidentally, the relay optical system 927 is employed here in order to prevent a drop in service efficiency of light caused by the diffusion of light due to the optical path length of blue light longer than that of any other colors. In other words, the relay optical system 927 is employed to transmit sub-beams incident upon the incident side lens 954 to the field lens 953 without change.

Each of the red, green, and blue beams is provided with a certain polarization by the incident side polarizers 960R, 960G, 960B upon incidence on the liquid crystal panels 925R, 925G, 925B. Thereafter, each polarized beam is modulated in each of the liquid crystal panels 925R, 925G, 925B in accordance with given image information and then transmitted to the transmitting side polarizers 961R, 961G, 961B as a modulated beam. Then, the transmitting side polarizers 961R, 961G, 961B allow only a certain polarized beam of the modulated beams to pass therethrough and then be transmitted to the cross dichroic prism 910. The transmitted polarized beams of respective colors are combined through the cross dichroic prism 910 into a combined beam, which is in turn transmitted towards the projection lens 6. This combined beam is projected as a color image onto a projection plane such as a projection screen by means of the projection lens 6.

(5) Layout of the Control Board and the Air Intake Fan

Figure 9:
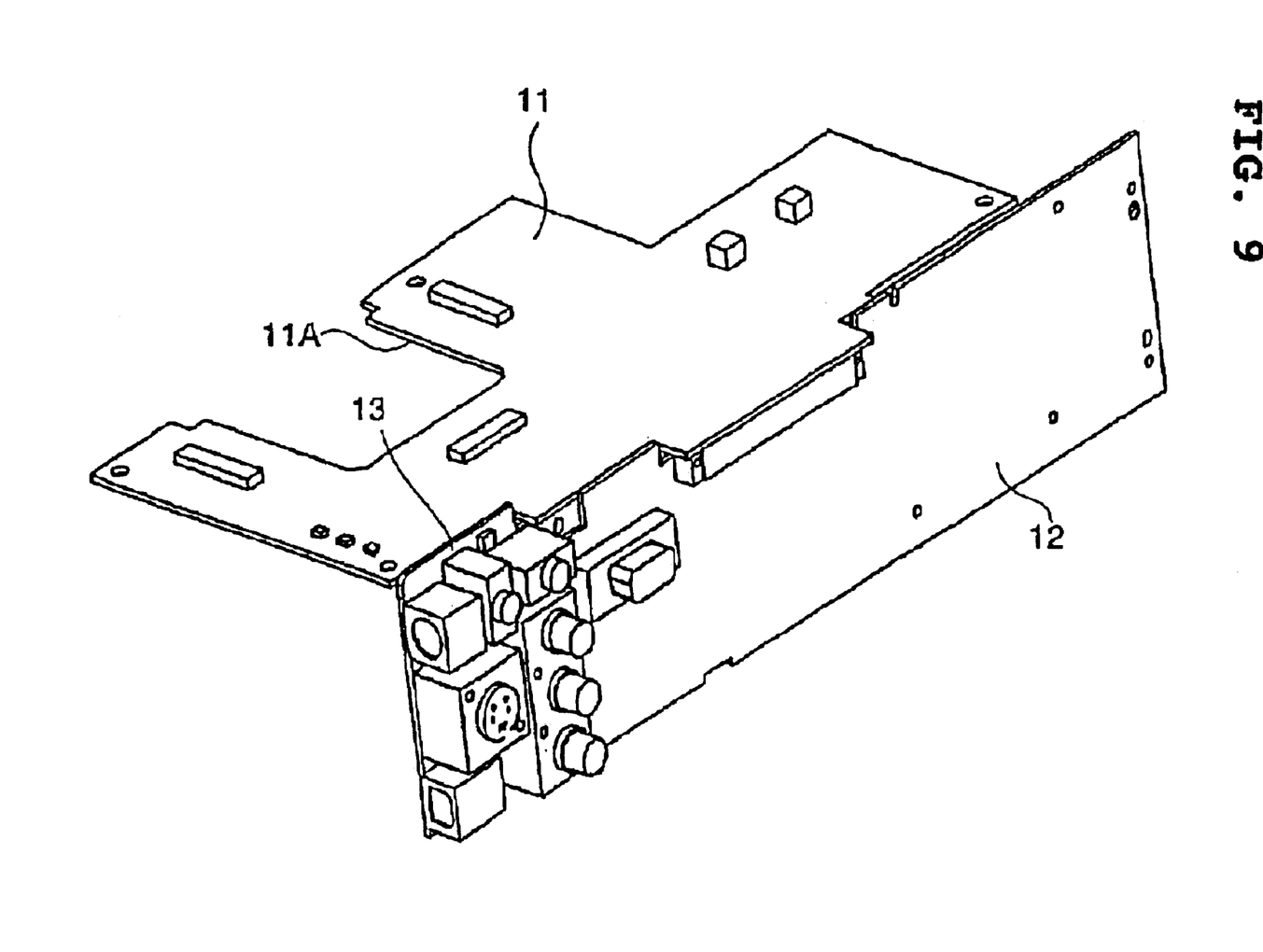
FIG. 9 is a perspective view illustrating the layout of each control board viewed from the rear side of the projector.

FIG. 9 is a perspective view illustrating the layout of each control board (the driver board 11, the main board 12, and the AV board 13), viewed from the rear side of the projector. As already explained, the driver board 11 is arranged in the horizontal direction perpendicularly to the main board 12 and the AV board 13, which are provided vertically at the back in the projector 1. These control boards 11, 12, 13 are placed with the driver board 11 being disposed oppositely to the top outside 9003 of the inner case 900. Then, from the respective edge sides, closest to the driver board 11, of the liquid crystal panels 925R, 925G, 925B, their connecting cables 925RC, 925GC, 925BC are taken out and connected to the driver board 11 in the shortest possible distance(see FIG. 6). In addition, there is formed a notched portion 11A at a corresponding position in the driver board 11, opposite to the cross dichroic prism 910. The notched portion 11A is adapted to accommodate the air intake fan 17, thereby making it possible to accommodate the air intake fan 17 therein efficiently.

Figure 10:
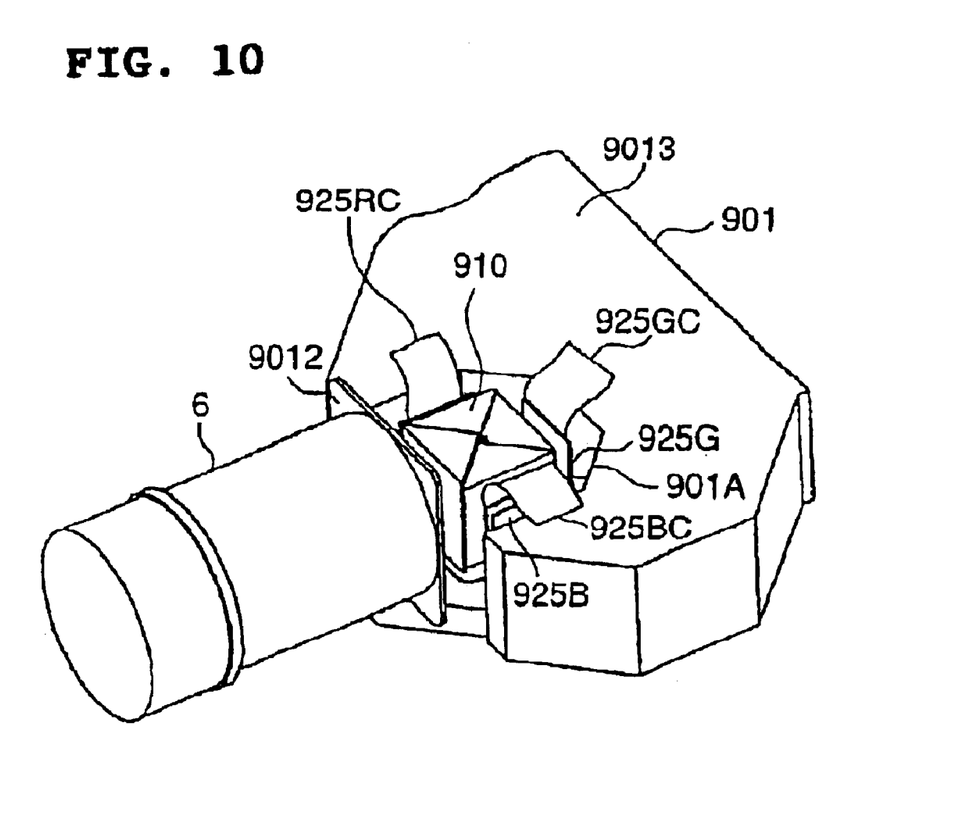
FIG. 10 is a partial perspective view illustrating the vicinity of a cross dichroic prism of an optical system according to another embodiment of the present invention.

FIG. 10 is a partial perspective view illustrating the vicinity of a cross dichroic prism of an optical system according to another embodiment of the present invention. An inner case 902 to be employed in this embodiment is configured in a manner such that a recessed portion is formed in the top outside 9003 of the inner case 900 described above, on the side closer to the projection lens in order to arrange the electro-optical device 925 and the cross dichroic prism 910 in the recessed portion. Therefore, with this inner case 901, the illuminating optical system 923, the color beam splitting optical system 924, and the relay optical system 927 are accommodated in an enclosure comprising the inner case 901 and the lower case 4. The electro-optical device 925 and the cross dichroic prism 910 are placed outside the enclosure. The cross dichroic prism 910 to which the liquid crystal panels 925R, 925G, 925B are fixed is fixed to the inner portion of a head plate 9012 in a recessed portion 901A of the inner case 901. Furthermore, the connecting cables 925RC, 925GC, 925BC from their liquid crystal panels are extended from their edge sides opposite to the sides where the cross dichroic prism 910 is fixed to the inner case 901, and are connected to the driver board 11 that is arranged in parallel with the top outside 9013 of the inner case 901. Incidentally, an air vent through which air for cooling these liquid crystal panels passes can be formed around where the cross dichroic prism 910 is installed in the recessed portion 901A of the inner case 901, thereby making it possible to improve the cooling effect. Other configuration may be the same as in the case where the inner case 900 is employed.

In the embodiments described in the foregoing, the driver board 11 is arranged on the top outside of the inner case 900 or 901, so that the inner case 900 or 901 gives the effect of preventing noise generated by the light source lamp unit 8 or radiant heat caused by the optical system. Therefore, if the noise or radiant heat has less influence or countermeasures are separately taken against them, it is possible to arrange the driver board 11 between the inner case 900 or 901 and the lower case 4.

(6) Structure and Layout of Light Source Lamp Unit

Figure 11:
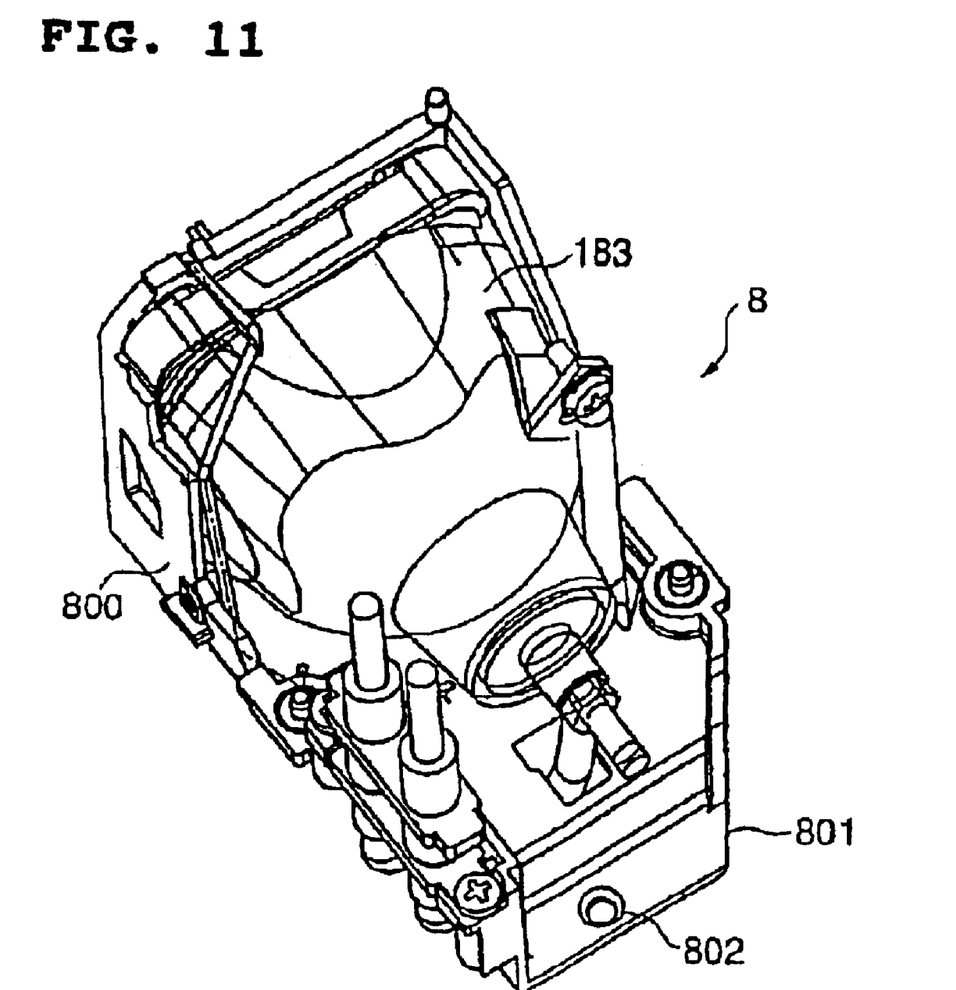
FIG. 11 is a perspective view illustrating a light source lamp unit.

FIG. 11 is a perspective view illustrating a light source lamp unit employed for this embodiment. The light source lamp unit 8 is held by the housing 800 with a base 801 for holding the light source device 813 comprising the light source lamp 181 and the concave mirror 182. As described above, the light source lamp unit 8 can be brought out of or into the inner case 900 or 901 disposed in the outer cases 2 through the bottom of the projector 1. The light source lamp unit 8 placed in the inner case 900 or 901 is fixed with a screw onto the lower case 4 using a screw hole 802 provided on the base 801. At this time, the bottom surface of the base 801 is exposed outside the lower case 4 and thus serves as a lid. Incidentally, the housing 800 for holding the light source lamp unit 8 is preferably formed of a resin to provide increased thermal insulation against the light source device 183.

Figure 12:
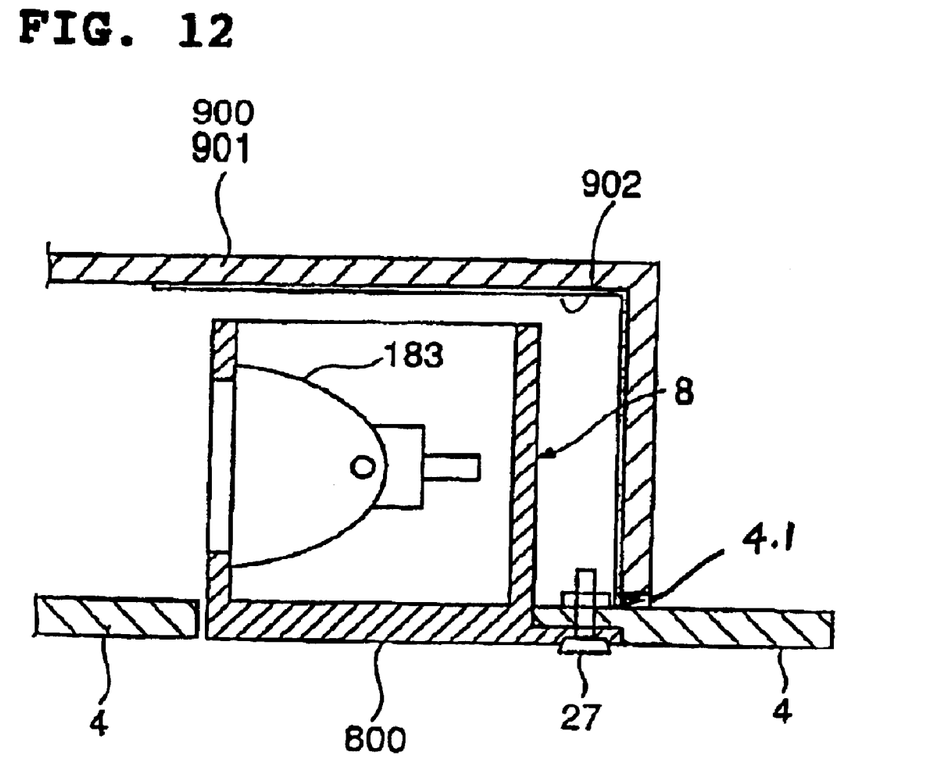
FIG. 12 is a conceptual view illustrating the layout of an inner case and a light source lamp unit.

FIG. 12 is a conceptual view illustrating the positional relationship between the inner case 900 or 901 and the light source lamp unit 8. As described above, the light source lamp unit 8 comprising the light source device 183 held by the housing 800 formed of a resin is inserted into the inner case 900 or 901 through the bottom portion of the lower case 4 to fix the light source lamp unit 8 to the lower case 4 by means of the screw 27. In addition, in this embodiment, the inner case 900 or 901 is covered with an insulator 902 around the light source lamp unit 8 (including at least the area opposite to the light source lamp unit 8) to prevent noise such as a spark from being generated between the light source lamp unit 8 and the inner case 900 or 901.

Incidentally, the present invention is not limited to the aforementioned embodiments but includes other arrangements that can achieve the object of the present invention, also including the following modifications shown below.

For example, in the aforementioned embodiments, the electro-optical device 925 comprises the three liquid crystal panels 925R, 925G, 925B. However, the present invention is not limited thereto but may be employed for a light modulation device comprising one or two liquid crystal panels.

Furthermore, the above described panel constituting the electro-optical device 925 is a liquid crystal panel. However, the present invention may be employed for a projector with a light modulation device comprising another device than a liquid crystal device, such as a plasma element or a device panel using a micro mirror.

Furthermore, the above described electro-optical device 925 is of a type to modulate light beams of R, G, and B while transmitting them. However, the present invention is not limited thereto but may be employed for a projector comprising a reflective light modulation device that modulates incident light while reflecting the light.

According to the present invention configured as described above, it is made possible to provide a projector further reduced in size and weight, while suppressing influence of EMI.

What is claimed is:

1. A projector comprising:
an optical system including:
a light source that emits light beam;
a color beam splitting optical system that splits the light beam from the light source into sub-beams of predetermined colors;
electro-optical devices that modulate the color sub-beams split by the color beam splitting optical system in accordance with image information; and
a projector lens that projects a resultant beam modulated by the electro-optical devices;
an inner case which is box-shaped and made of a single piece to which optical components constituting the optical system are attached, the inner case having an open bottom face;
an upper outer case and a lower outer case which are vertically separable; and
an enclosure which is constituted by the inner case and the lower outer case; the open bottom face of the inner case being covered with the lower outer cases.

2. The projector according to claim 1, wherein the projection lens is attached to the inner case.

3. The projector according to claim 1, wherein a thermal insulation material is interposed between the inner case and the lower outer case.

4. The projector according to claim 3, wherein the thermal insulation material is formed in a shape of a sheet.

5. The projector according to claim 1, wherein a mirror and lens, constituting the optical system are fixed together by resilient clips.

6. The projector according to claim 1, wherein a cable electrically connects the electro-optical device to a driver board that controls the electro-optical device is led out from one side of the electro-optical device to the driver board.

7. The projector according to claim 6, wherein the driver board that controls the electro-optical device is disposed on the top outside of the inner case.

8. The projector according to claim 7, wherein a notched portion is formed on the driver board, and a fan that cools the electro-optical device is accommodated in the notched portion.

9. The projector according to claim 6, wherein the driver board that controls the electro-optical device is disposed adjacent to the lower outer case where the inner case is fixed.

10. The projector according to claim 1, wherein the lower outer case is fixed to the inner case for positioning and supporting the optical components.

11. The projector according to claim 1, wherein the inner case and the lower outer case that accommodate the color beam splitting optical system are fixed with screws to each other.

12. The projector according to claim 1, wherein part of a housing that holds the light source is placed on an outer surface of the lower outer case, and is attachable to or detachable from the lower outer case.

13. The projector according to claim 12, wherein said housing that holds the light source is formed of a resin.

14. The projector according to claim 1, comprising an insulation coating film applied to the inner case in facing relation to said light source.

15. The projector according to claim 1, wherein the inner case is formed of a resin or metal.

16. The project or according to claim 1, wherein the upper outer case and the lower outer case are formed of a resin or metal.

17. A projector comprising:

a light source lamp unit to emit a light beam; an optical unit including a color beam splitting optical system to split the light beam into sub-beams of predetermined colors and electro-optical devices to modulate the sub-beams in accordance with image information; a projector lens to project resultant beams modulated by the electro-optical devices; and vertically separable upper and lower cases, wherein said optical unit comprises a box-shaped inner case made of a single piece of molded material on which the color beam splitting optical system and electro-optical devices are mounted, said inner case having an open bottom face;

the open bottom face is covered with the lower outer case so as to form an enclosure in which the beam splitting optical system is housed;

said light source lamp unit comprises a housing for holding a light source lamp;

said lower outer case has an opening; and the housing is detachably attached to the lower case such that the bottom of the housing is exposed outside the lower case through the opening and serves as a lid of the opening.

* * * * *